June 21, 1955  A. BARSAM, SR  2,711,121
MOTION PICTURE PRINTER
Filed March 30, 1948  8 Sheets-Sheet 1

Inventor
ARTHUR BARSAM, SR.
Attorney

June 21, 1955     A. BARSAM, SR     2,711,121

MOTION PICTURE PRINTER

Filed March 30, 1948     8 Sheets-Sheet 2

Inventor
ARTHUR BARSAM, SR.

By Robert W. Fulwider
Attorney

June 21, 1955  A. BARSAM, SR  2,711,121
MOTION PICTURE PRINTER
Filed March 30, 1948  8 Sheets-Sheet 4

Inventor
ARTHUR BARSAM, SR.
By Robert W. Fulwider
Attorney

Inventor
ARTHUR BARSAM, SR.

Attorney

INVENTOR.
ARTHUR BARSAM, SR.
BY
ATTORNEY.

June 21, 1955　　　A. BARSAM, SR　　　2,711,121
MOTION PICTURE PRINTER

Filed March 30, 1948　　　　　　　　　8 Sheets-Sheet 7

INVENTOR.
ARTHUR BARSAM, SR.
BY
Robert W. Fulwider
ATTORNEY.

June 21, 1955 A. BARSAM, SR 2,711,121
MOTION PICTURE PRINTER
Filed March 30, 1948 8 Sheets-Sheet 8

INVENTOR.
ARTHUR BARSAM, SR.
BY
ATTORNEY.

United States Patent Office

2,711,121
Patented June 21, 1955

2,711,121

MOTION PICTURE PRINTER

Arthur Barsam, Sr., Los Angeles, Calif.

Application March 30, 1948, Serial No. 17,938

29 Claims. (Cl. 95—75)

My invention relates broadly to the field of photography, and more particularly to a device that is adapted to automatically print motion picture film.

In the motion picture industry the entertainment is first recorded on a moving strip of negative film in the form of a series of individual scenes, with each of the scenes depicting a setting or location in which action on the part of the actor or actors transpires. Due to the variety of the settings and location, and the various light conditions under which each is photographed, it will be apparent that little or no uniformity in the light density of the resulting negative film is possible. It is therefore the purpose of my invention to provide a device whereby positive film having a substantially constant light number can be printed from a negative film of varying light density.

Although numerous devices to print positive film to a constant light number have been used in the past they have had the disadvantage that they require an operator to be present during the printing operation in order that certain adjustments and settings can be made on the printer to compensate for the changing light density of the negative film passing therethrough. It is therefore to eliminate the human error that such adjustments and changes will fail to be made, or made incorrectly, that I have devised my printer which is fully automatic in operation.

A major object of my invention is to provide a motion picture printer that is fully automatic in operation, is capable of printing a positive film having a substantially constant light number from a negative film having portions of varying light density, will print from a negative film which is moving at a constant speed therethrough, can be operated by relatively inexperienced personnel, can be adjusted to print positive film of any desired light number, will eliminate wastage of film due to human error in the printing thereof, and will be sufficiently light in weight to permit the printer to be moved from one location to another.

A further object of my invention is to supply a printer than can be actuated to make a light change for each frame of film which is continuously moving therethrough, and can be easily adapted for use with either a new or existing piece of printing equipment.

These and other objects and advantages of my invention will become apparent from the following description of a preferred form and certain modifications thereof, and from the drawings illustrating those forms in which.

Figures 1, 2:
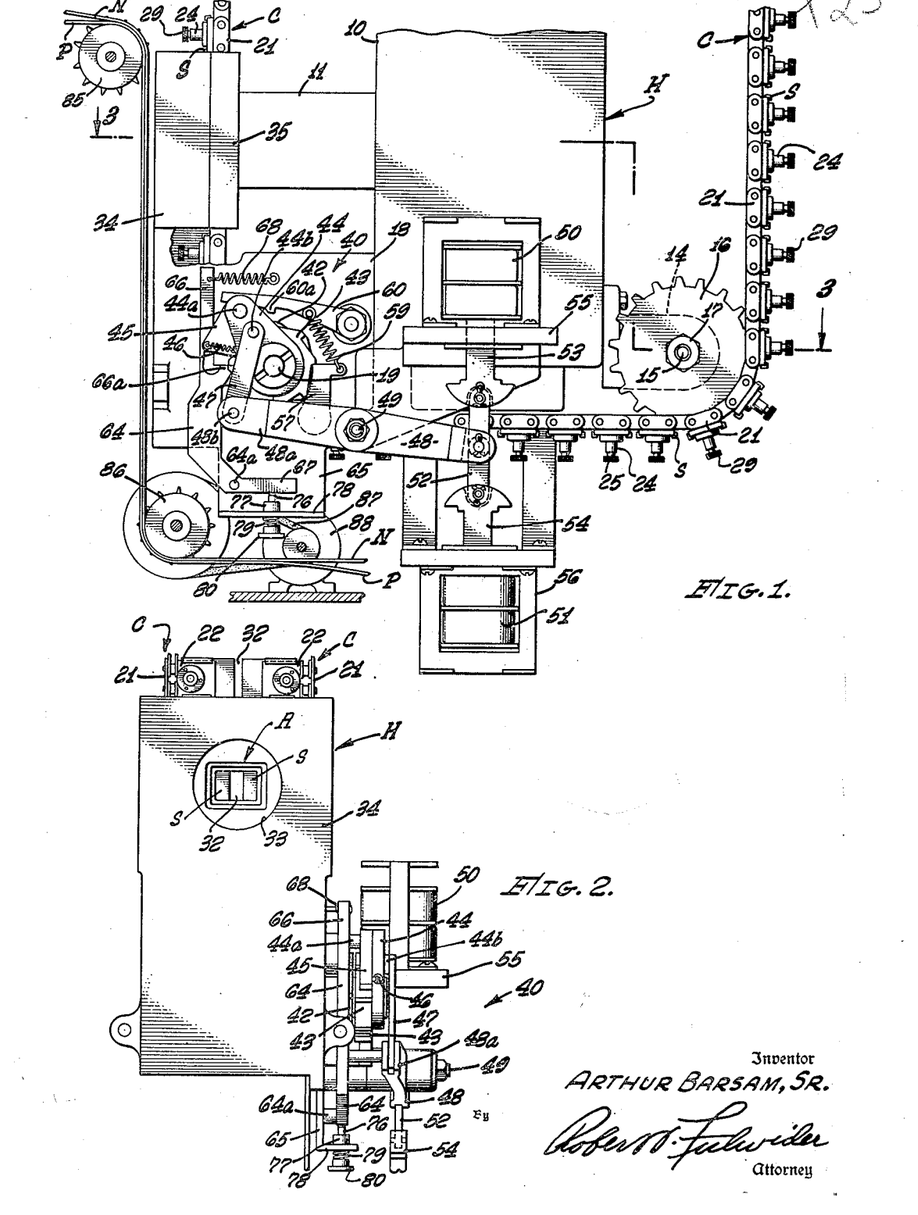
Fig. 1 is a side elevational view of a preferred form of my motion picture printer.
Fig. 2 is an end elevational view of the device.
Figure 3:
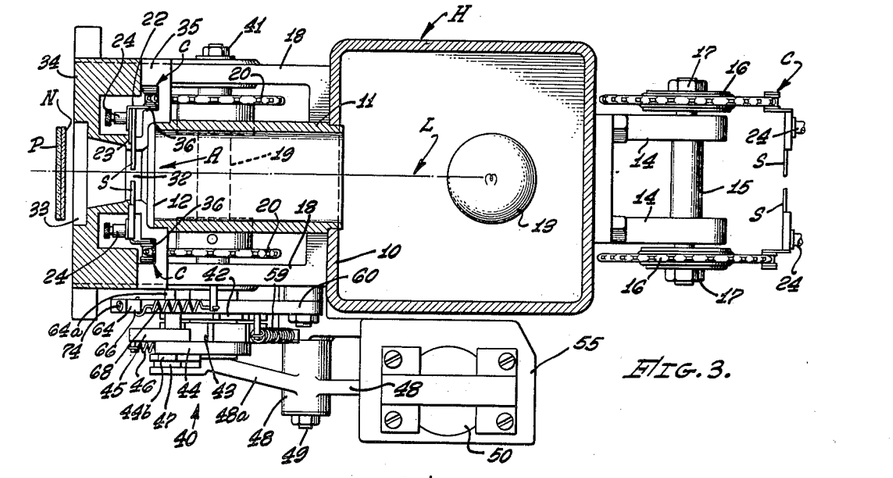
Fig. 3 is a horizontal cross-sectional view of the device taken on the line 3—3 of Fig. 1.

Referring now to Figs. 1, 2 and 3 for the general arrangement of a preferred form of my invention it will be seen that a housing H encloses a source 13 of light rays L of constant intensity which is emitted through an aperture A. The quantity of the light passing from the aperture A to print a constantly moving strip of positive film P from a similar strip of negative film N is controlled by the width of the space existing between two shield members S which are intermediately positioned between the aperture A and the films. Each of the shields S is supported from one of the two rotatably mounted roller chain link belts C that are actuated by an electrically operated mechanism to place shields having the proper spacing therebetween, between the aperture A and the film P and N whereby the positive film P may be printed to a substantially constant light density irrespective of the variation in the light density of the negative film N.

The housing H is preferably formed from sheet metal as a vertical rectangular box 10 having a top of conventional design (not shown) for access to the interior thereof. Extending forwardly from the upper portion of the box 10 is a sheet metal light passage 11 having a vertical end plate 12 affixed thereto in which is formed a rectangular aperture A. An incandescent electric light bulb 13 situated within the housing H supplies the light L of constant intensity, and for convenience in operating the bulb the electrical wiring leading thereto is preferably supplied with a conventional manually operated switch.

Disposed on the lower rearward portion of the box 10 are two laterally spaced journal boxes 14 that rotatably support a horizontally positioned shaft 15 which extends therethrough. Each end of the shaft 15 is threaded to permit a sprocket 16 to be rigidly affixed thereto by an engaging nut 17. Two laterally spaced vertical L-shaped members 18 are mounted on the lower forward face of the housing 10 under the light passage 11, and rotatably support a horizontal shaft 19 therebetween. Rigidly affixed to the shaft 19 within the confines of the members 18 are two sprockets 20, each of which is in alignment with one of the sprockets 16. Movably mounted on each of the sprockets 16 and 20, and similar sprockets situated thereabove (not shown) is one of the endless roller chain link belts C. Both of the belts C are identical in construction and include a number of conventional roller chain links 21, each of which supports an L-shaped member 22 on the interior face thereof. Each of the members 22 is formed with an inwardly extending arm 23 that supports one of the shields S. Each of the shields S is of a height slightly greater than that of the aperture A whereby when a shield is situated in front of the aperture a portion of the aperture will be completely masked.

Figure 4:
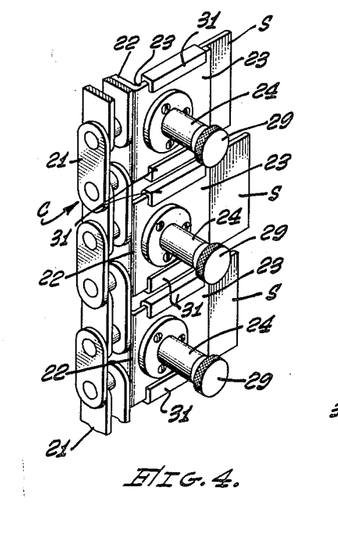
Fig. 4 is a perspective view of a portion of one of the endless roller chain link belts used with the device, with the removable members supported therefrom which control the intensity of the light used in the printing operation.
Figure 5:
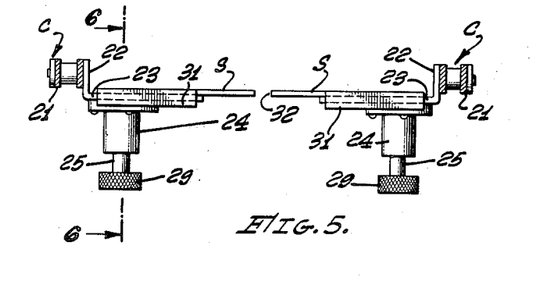
Fig. 5 is a plan view of a pair of laterally spaced roller chain link belts with the members used in controlling the intensity of the printing light removably supported therefrom.
Figure 6:
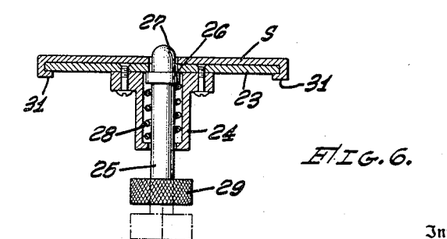
Fig. 6 is an enlarged vertical cross-sectional view of one of the light regulating members taken on the line 6—6 of Fig. 5.

A hollow cylinder 24 is provided for each of the arms 23, and is supported from the outer face thereof in alignment with a bore that extends through the arm. Slidably mounted in each of the cylinders 24 as can best be seen in Figs. 4, 5 and 6 is a pin 25 having a collar 26 formed thereon which engages the interior sidewalls of the cylinder. To force the pin 25 outwardly at all times whereby its end portion 27 will project through the bore in arm 23 a helical spring 28 is placed in compression within the confines of cylinder 24, with one end of the spring in contact with the outer end portion thereof, and the opposite end engaging the inner end face of the collar 26. Each of the pins 25 is provided on its exterior end with a handle 29 whereby the pin can be pulled outwardly against the compression of spring 28 to bring pin portion 27 flush with the interior face of arm 23 in order that a shield S can be slidably mounted on the member 22 as will hereinafter be explained.

Each of the shields S is formed as a rectangular plate with an inwardly extending lip 31 being formed along each longitudinal side thereof which serves to engage one of the edges of arm 23 and hold the shield in place thereon. Of course prior to the shield S being mounted on one of the arms 23 the pin 25 must be pulled outwardly to place the portion 27 in a non-obstructing position; but after the shield is fully positioned thereon the pin is released to be forced inwardly by the spring 28 whereupon it engages a bore formed in the shield. Thus, each of the shields can be firmly mounted on one of the arms 23, but can be instantly removed therefrom by a sliding movement when the pin 25 is pulled outwardly into a non-engaging position.

In Fig. 5 it will be seen that upon shields S of identical length being mounted on adjoining arms 23 a space 32 is left between the inner edges of the shields which is centrally disposed with relation to the aperture A as can best be seen in Figs. 2 and 3. As pairs of shields S of varying lengths move downwardly in front of the aperture A different quantities of light L will be emitted from the spaces 32, with each quantity being adapted to print positive film P to a substantially constant light density from a particular section of the negative film N. Prior to the light L which has passed through the space 32 reaching the films P and N it passes through a ground glass diffusion plate 33. The plate 33 is preferably supported in an opening formed in the web of a vertical channel shaped member 34 whose flanges are affixed in a conventional manner to a rectangular member 35. The member 35 is provided with two laterally spaced vertical grooves 36 on the forward face thereof which permit the belts C to move downwardly therethrough. In Fig. 3 it will be seen that the member 35 is supported on the forward edges of the two laterally spaced members 18.

To advance the belts C whereby the quantity of printing light L is controlled by positioning shields S saving the proper spacing 32 therebetween in front of the aperture A the mechanism 40 as best seen in Fig. 1 is employed. The shaft 19 which is actuated by the mechanism 40 is prevented from being laterally displaced from the members 18 by one end being provided with a washer and nut 41, and the opposite end with an inwardly and outwardly positioned ratchet 42 and 43 respectively, which are rigidly attached thereto. The inner ratchet 42 is formed with triangularly shaped teeth which are adapted for rotating the ratchet in a clockwise direction only, while the ratchet 43 is provided with similar teeth but oppositely disposed whereby it can only be rotated in a counter-clockwise direction.

In order that the shaft 19 and the sprockets 20 mounted thereon can be rotated in a counter-clockwise direction by the use of the sprocket 43 an upwardly extending arm 44 is rotatably mounted on the outer end of shaft 19 adjacent to sprocket 43, and is held in place thereon by conventional means. Provided on the upper extremity of the arm 44 is an inwardly extending pin 44a that pivotally supports a downwardly extending pawl 45 which is adapted to engage the teeth of ratchet 43. Pawl 45 is at all times urged rearwardly into contact with the teeth of ratchet 43 by a helical spring 46 that is supported in tension between a pin situated on the forwardly extending portion of the pawl and a suitable fastening affixed to the forward edge of arm 44 as can best be seen in Fig. 1.

To permit the arm 44 to be actuated a link 47 is pivotally supported therefrom on a pin 44b that is situated on the outer portion of the arm a substantial distance below the pin 44a. The lower portion of the link 47 is movably connected to the forward end portion of a substantially horizontal lever 48 by a pin that engages both members. A horizontal shaft 49 which extends outwardly from the lower portion of one of the L-shaped members 18 engages a bore formed near the center of the lever 48, and permits vertical rotational movement to be imparted to the lever by the electrical energization of either of two solenoids 50 and 51.

The solenoid 50 is situated above the rearward portion of lever 48 and solenoid 51 occupies a similar position therebelow. A substantially vertical connecting link 52 is pivotally connected at the center thereof to the rearward portion of the lever 48, with the upper portion of the link being connected by a pin to a plunger 53 which is slidably mounted in the solenoid 50, and the lower portion of the link is similarly connected to a plunger 54 that is movably mounted in the solenoid 51.

Solenoid 50 is preferably mounted on an L-shaped support 55 that is affixed to the lower portion of the housing H, and the solenoid 51 is supported on a bracket 56 that is also affixed to the housing as can best be seen in Fig. 1. Upon solenoid 50 being electrically energized the lever 48 is rotated in a counter-clockwise direction, with the forward portion 48a thereof moving downwardly to cause pawl 45 to impart intermittent counter-clockwise rotation to ratchet 43, the sprockets 20 supported on shaft 19, and the roller chain belts C engaging the sprockets.

Figure 7:
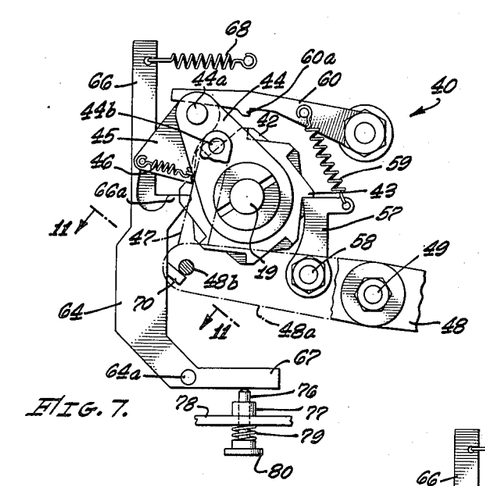
Fig. 7 is a side elevational view of the mechanism utilized in advancing the chain supported members whereby the intensity of the printing light is regulated.
Figure 8:
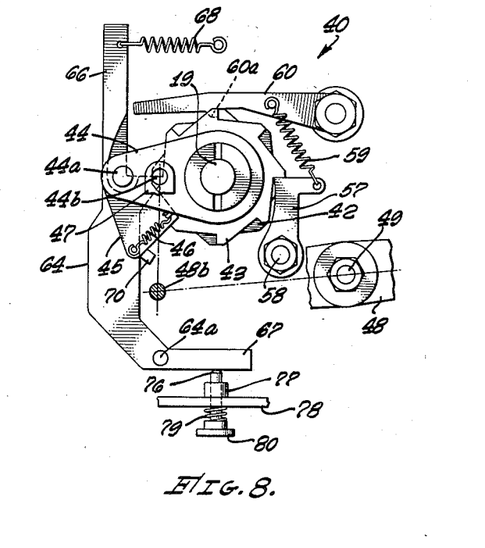
Fig. 8 is a side elevational view of the mechanism after the advancement of one of the members has been completed but before the mechanism has returned to its initial position as shown in Fig. 7.

To prevent the sprockets 20 and chain belts C from being advanced more than one tooth length of the ratchet 43 by one downward stroke of the forward lever portion 48a, the positive locking mechanism shown in Figs. 7, 8, 9 and 10 is utilized. In Fig. 7 the mechanism 40 is shown in a position prior to the lever portion 48a moving downwardly to cause the sprocket 43 to be advanced one tooth length. To prevent any clockwise movement of the ratchets 42 and 43 as the lever portion 48a returns to the position shown in Fig. 1 an L-shaped catch 57 is rotatably mounted on a horizontal pin that extends outwardly from the lower portion of one of the members 18, with the catch being urged forwardly into contact with the teeth of sprocket 43 at all times by a helical spring 59 that is attached to the most rearwardly extending portion of the catch. The spring 59 is at all times in tension and has its upper end affixed to a substantially horizontal, rotatably mounted, detent 60 that is situated directly above the ratchets 42 and 43. In Fig. 8 it will be seen that any clockwise motion of the ratchets 42 and 43 is impossible due to the catch 57 at all times engaging the sprocket 43.

In Fig. 7 it will be seen that due to the spring 57 being at all times in tension that the downwardly extending portion 60a of the detent would normally engage the teeth of ratchet 42, but is prevented from so doing by the outer portion of the detent 60 resting on the inwardly extending pin 44a. However, as the arm 48 rotates downwardly to advance the ratchets 42 and 43 one tooth length the detent 60 is also permitted to rotate downwardly to a position where the engaging member 60a is in contact with one of the teeth of ratchet 42, which insures that the ratchets will not be rotated in a counter-clockwise direction more than one tooth length by one stroke of lever 48.

To further insure that no counter-clockwise rotation of the ratchets 42 and 43 takes place either during the time that the lever 48 is returning from its ratchet advancing stroke to its normal position shown in Fig. 1, or when the mechanism 40 is at rest, a substantially vertical L-shaped pawl 64 is provided, and situated on the forward side of the ratchets. The pawl 64 is rotatably mounted on an outwardly extending horizontal pin 64a that is supported from a bracket 65 which extends downwardly from one of the members 18. In Fig. 7 it will be noted that the pawl 64 includes a substantially vertical arm 66 having a rearwardly extending engaging member 66a and a substantially horizontal arm 67. A helical spring 68 which is at all times in tension extends from the upper portion of arm 66 to a pin affixed to the member 18, and serves at all times to urge an engaging member 66a extending rearwardly from the arm into contact with the teeth of ratchet 42.

Figure 11:
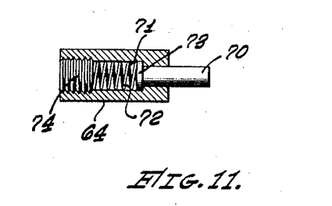
Fig. 11 is a longitudinal cross-sectional view of a spring loaded member taken on the line 11—11 of Fig. 7.

It will be noted in Fig. 7 that the pawl 45 is positioned a considerable distance above one of the teeth of the ratchet 43, and that no movement of the ratchets will take place until the tooth is so engaged. This play between the pawl 45 and one of the teeth of ratchet 43 is necessary in order that the pawl engaging member 66a can be moved forwardly out of contact with one of the teeth of ratchet 42 to permit counterclockwise rotation of the ratchets to take place. During the downward rotation of the arm portion 48a a pin 70 is encountered by an inwardly extending pin 48b, which is situated on the forward end of lever 48. The pin 70 as can best be seen in Figs. 7 and 11 is slidably supported in a downwardly extending bore 71 formed in the arm 66, and is at all times urged rearwardly by a helical spring 72 that has its rearward end in contact with a head 73 formed on the pin, while its forward end is in contact with a plug 74 that engages the forward threaded portion of the bore. As downward movement of the pin 48b occurs it encounters the upper edge of the pin 70 with the result that the pawl 64 is rotated in a counter-clockwise direction to disengage members 66a from contact with the teeth of sprocket 42 whereby pawl 45 is free to advance sprocket 43 in a counterclockwise direction.

Figure 10:
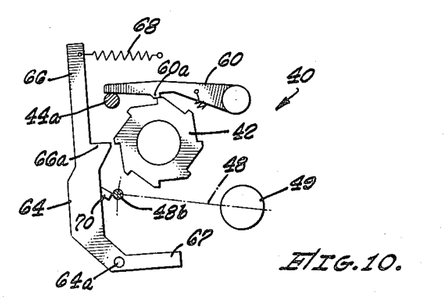
Fig. 10 is a schematic elevational view of the inner ratchet and pawls just prior to completing a change in the position of the light regulating members.

At the same time the lever portion 48a is moving downwardly the detent 60 is doing likewise as shown in Fig. 10 due to the downward movement of pin 44a which hitherto has prevented it from being in contact with sprocket 42. In Fig. 8 the pawl 45 has advanced the sprockets 42 and 43 one tooth length, and the detent member 60a is fully engaging one of the teeth of sprocket 42 to prevent the sprockets from being advanced by momentum more than one tooth length. Likewise catch 57 has engaged one of the teeth of ratchet 43 to prevent any clockwise movement of the ratchets as arm 48 returns to its normal position as shown in Fig. 1.

Figure 9:
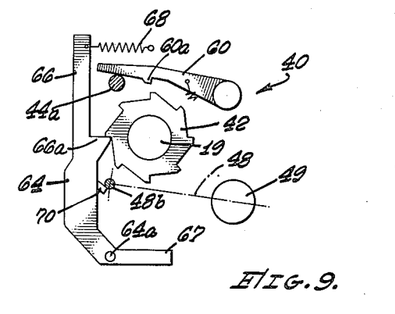
Fig. 9 is a schematic side elevational view of the inner ratchet and pawls shown in the initial position which they occupy in Fig. 7.

Upon the solenoid 51 being electrically energized as will hereinafter be explained, the lever 48 is rotated in a clockwise direction. In Figs. 9 and 10 it will be seen that this upward movement of lever portion 48a is achieved by it moving the pin 70 inwardly until it has passed thereby, and returned to its normal position shown in Fig. 7. The detent 60 has now been moved upwardly by pin 44a and the function of member 60a taken over by member 66a to prevent counter-clockwise rotation of the ratchets 42 and 43. Upon completion of the above described operation the chains C are advanced one link length to interpose shields S between aperture A and the films P and N whereby light of the proper intensity is provided to print the positive film to a substantially constant light density irrespective of the light number of the negative film from which it is being printed. It will be apparent that any slippage of the correct shields S from this position is impossible due to the positive locking means above described.

To manually advance the films P and N to a particular frame, which at times may be desirable, a vertically positioned pin 76 having a collar 77 formed thereon is slidably mounted in the horizontal shelf portion 78 of the bracket 65 as can best be seen in Figs. 1 and 7. A helical spring 79 is mounted on the lower portion of pin 76 between the bracket shelf 78 and a handle 80 formed on the lower extremity of the pin, and serves to normally hold the pin in a non-actuating position. However, upon pressure being applied to the lower face of handle 80 the pin 76 is moved upwardly to contact the lower edge of arm 67, and rotate the pawl 64 in a counter-clockwise direction whereby member 66a is disengaged from ratchet 42. With the mechanism 40 in this position the sprockets 42 and 43 can be rotated in a counter-clockwise direction to advance the films P and N to the desired frame.

The films P and N as can best be seen in Fig. 1 are continuously moving downwardly in front of the diffusion plate 33 by passing over an upwardly positioned idling sprocket 85 and a sprocket 86 situated in front of and below the mechanism 40. Sprocket 86 is driven by an endless belt 87 that engages a suitable pulley on a motor 88, which motor by conventional means synchronously drives two upwardly and two downwardly positioned reels (not shown) which are used in holding the films P and N prior to and after being exposed to the printing light L.

In the use of my invention the light density of each scene of the negative film N is determined by examining the film with conventional optical means adapted for this purpose. Whenever a change in the light density of the negative film N is noted that is sufficiently great as to warrant a change in the intensity of the printing light L a notch 89 is cut in the side of the film at an appropriate distance from the point where the change is desired. At the same time a pair of shields S is mounted on the chain belts C which will provide an opening 32 therebetween which will reduce the quantity of the printing light L whereby the positive film P will have a constant light density irrespective of the light density of the particular portion of the negative film N from which it is being printed. As the shields S are provided in a variety of lengths I have found it convenient to designate each shield by a number whereupon after the light density of the negative is determined it will be a simple matter to select shields of the proper length to control the intensity of the light L in printing from a particular portion of the negative film N. In the operation of my printer it may be found more convenient to completely examine the negative film N for changes in light density, making a notch 89 in the side of film N and a notation of the light density at the portions where a change is desired, and then at a later time taking this tabulation of light densities and mounting the shields S required to provide the correct light on the chain belts C. Thus whether the shields S are mounted in order on the chain belts C as the light density of the negative film N is determined or afterwards the result is the same; that is, the negative is provided along one side with a number of irregularly spaced notches 89 each of which will cause a change in the position of the shields S, and the belts C will have mounted in order thereon a number of pairs of shields S of varying lengths that will cause the quantity of the printing light L to be changed whereby the positive film P is printed to a constant light density.

Figure 24:
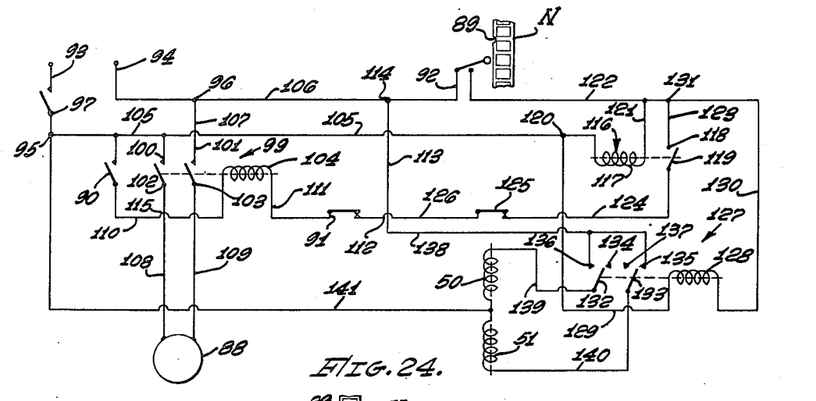
Fig. 24 is a diagrammatic view of the electric circuit used in automatically operating the preferred form of the printer and the two modifications thereof.

To automatically carry out the changing of the light shields S due to the use of the notches 89, the printer is provided with an electrical circuit for actuating the solenoids 50 and 51. In Fig. 24 I have indicated a schematic wiring diagram illustrating the various electrical components used in changing the shields S whereby the proper quantity of light L is provided for printing the film P. Broadly, the circuit includes a momentary contact switch 90 for placing the printer in operation, a normally closed switch 91 for stopping the printer after the film P has been printed, a normally open control switch 92 for energizing the solenoids 50 and 51 when it encounters one of the notches 89, and the necessary relays to accomplish these results.

Considering first the circuit for the motor 88, it will be seen that a pair of conductors 93 and 94, connected to a source of electrical power (not shown) terminate at junction points 95 and 96 respectively, with a master switch 97 being inserted in the conductor 93 to control the entire operation of the device. A double pole single throw relay 99 controls the actual application of power to the motor 99, the relay having contacts 100 and 101 adapted to complete circuits to corresponding contacts 102 and 103 respectively when the operating coil 104 of the relay is energized. Conductors 105 and 106 are connected to junction points 95 and 96 respectively, and contact 100 of the relay 99 is connected to conductor 105, while contact 101 is connected to junction point 96 by a conductor 107. Conductors 108 and 109 connect the contacts 102 and 103, respectively, to the motor 88, and thus the latter is energized whenever the operating coil 104 of the relay 99 is energized.

The operating coil 104 is controllably energized by a circuit including the previously mentioned switches 90 and 91, one terminal of the momentary contact switch 90 being connected to conductor 105, while the other terminal thereof is connected by conductor 110 to one terminal of the operating coil 104. The other terminal of the operating coil is connected by conductor 111 to one terminal of normally closed switch 91, the other terminal of that switch being connected to a junction point 112 which is connected by a conductor 113 to a junction point 114 at the end of conductor 106. To complete this portion of the circuit, the conductors 108 and 110 are joined at junction point 115. The circuit for the operating coil 104 may now be traced, starting at junction point 95 and continuing through conductor 105, momentary contact switch 90, and conductor 110 to one terminal of the operating coil. The other terminal thereof is connected through conductor 111 and normally closed switch 91 to junction point 112, through conductor 113 to junction point 114, and thence through conductor 106 to junction point 96.

It will be noted that the contacts 100 and 102 of the relay 99 constitute a switch which is connected in parallel with the momentary contact switch 90, and hence once the relay coil 104 has been energized by the momentary closure of switch 90, the coil will remain energized by reason of the completion of a parallel circuit through the contacts 100 and 102 which thereafter supply the necessary power to the junction point 115. As previously mentioned, to de-energize the relay 99, the normally closed switch 91 is opened, thereby interrupting the circuit to the coil whether switch 90, or contacts 100 and 102, or both, are used to attempt to complete the circuit.

To selectively operate the solenoids 50 and 51, I employ the switch 92 which is operated by the notches in the film. However, since the operation of the switch 92 may be very rapid, depending upon the lineal speed of the film, I provide auxiliary circuit means to insure that the solenoids will be positively operated to change the light shutter. To accomplish this, I make use of a holding relay 116 having an operating coil 117 with a single pole single throw pair of contacts 118 and 119. One terminal of the operating coil 117 is connected to a junction point 120 at the end of conductor 105, while the other terminal of the coil is connected by conductors 121 and 122 to one terminal of the switch 92. The other terminal of this switch is connected to junction point 114, and thus when the switch is closed, a circuit is completed from junction point 95, through conductor 105 and junction point 120 to one terminal of the coil 117, the other terminal thereof being connected through conductors 121 and 122 to switch 92 and thence through conductor 106 to junction point 96.

Contact 118 of the relay 116 is connected by conductor 123 to conductor 122, while contact 119 is connected by conductor 124 to one terminal of a normally closed switch 125, the other terminal of which is connected by conductor 126 to junction point 112. Since, as previously mentioned, junction point 112 is connected by conductor 113 to junction point 114, the effect of closing the contacts 118 and 119 will have the same effect as the closing of switch 92, and the operating coil 117 will be energized by the closing by either or both of these two parallel circuits.

The actual energization of the solenoids 50 and 51 is controlled by a double pole double throw relay 127 having an operating coil 128. One terminal of this operating coil is connected by a conductor 129 to junction point 120, while the other terminal of the coil is connected by conductor 130 to the junction point 131 of the conductors 122 and 123. Consequently, the operating coil 128 of relay 127 is connected in parallel with the operating coil 117 of relay 116, and both relays will be energized and de-energized simultaneously.

The contacts of relay 127 include a pair of movable contacts 132 and 133 adapted, when the operating coil 128 is de-energized, to bear against fixed contacts 134 and 135 respectively. When the operating coil 128 is energized, the same movable contacts 132 and 133 are adapted to bear against fixed contacts 136 and 137, respectively. By connecting fixed contacts 135 and 136 together and, by conductor 138, to junction 112, movable contact 133 will be energized when the operating coil 128 is energized. From movable contact 132, a conductor 139 leads to one terminal of the solenoid 50, while from movable contact 133 a conductor 140 leads to one terminal of solenoid 51. The other terminals of solenoids 50 and 51 are connected together and by conductor 141 to junction point 95, so that the circuit for the solenoids may now be traced. Starting at junction point 95, current will flow through conductor 141 to the common terminal of the solenoids 50 and 51, and will normally flow through solenoid 51 and conductor 140 to movable contact 133 of the relay 127, and thence through fixed contact 135 and conductor 138 to junction point 112 which, as previously mentioned, is electrically connected at all times to junction point 96. When the operating coil 128 of relay 127 is energized, the circuit through the solenoid 51 is broken, and current will instead flow through solenoid 50 and conductor 139 to movable contact 132 of the relay, and thence through fixed contact 136 and conductor 138 to junction point 112.

It will be apparent that because of the holding circuit relay 116, once the switch 92 is operated by the notch in the film, the relay 127 will be energized and remain energized until the holding circuit is interrupted. This is done by disposing the switch 125 above the solenoid 50 in such a manner that the movable contact of switch 125 is placed in the open position when the solenoid 50 has pulled the plunger 53 to the limit of its travel. With switch 125 open, the relay 116 is de-energized and the contacts 118 and 119 return to their normally open position, simultaneous with the de-energization of coil 128 of relay 127 and the return of movable contacts 132 and 133 to their normal position. In this way, only a very brief closure of switch 92 is necessary to operate the holding circuit relay 116, but the latter will remain closed until such time as the solenoid 50 has moved the plunger 53 its maximum distance, whereupon this solenoid is de-energized and solenoid 51 is energized in place thereof to return the lever 48 to its normal position as shown in Fig. 1. Thus by the use of the above described electrical circuit each of the notches 89 automatically causes the changing of the shields S to those having a light opening 32 therebetween which will regulate the quantity of the light L to a degree which will print the positive film P to a constant light density.

Figure 12:
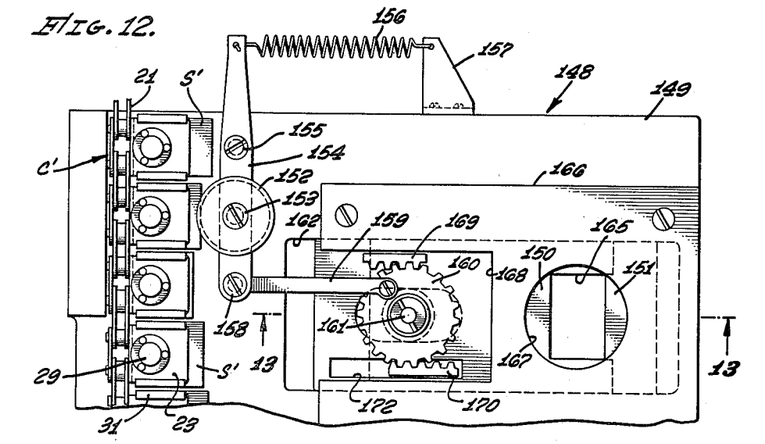
Fig. 12 is a side-elevational view of a modified form of mechanism employing but a single roller chain link belt to control the intensity of the printing light.
Figures 13, 14:
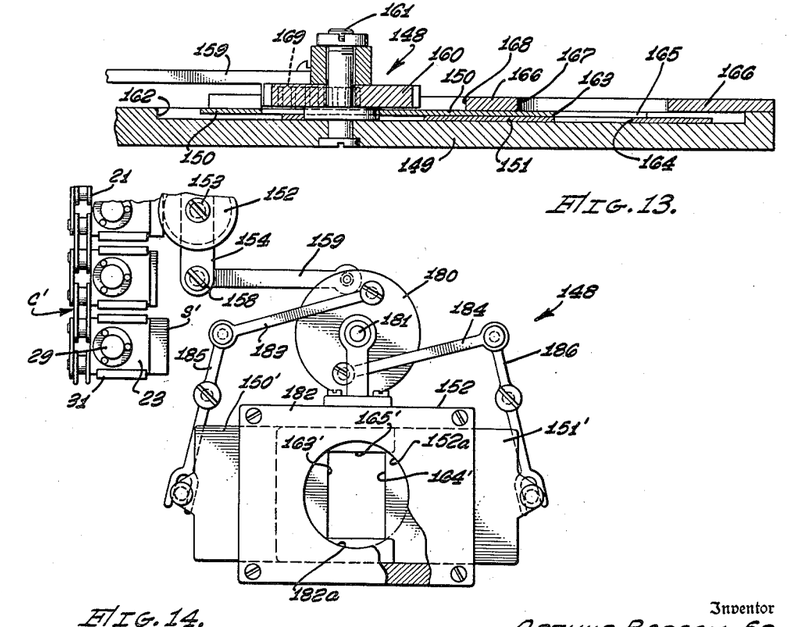
Fig. 13 is a horizontal cross-sectional view of the aperture mechanism used with the modified form of my device taken on the line 13—13 of Fig. 12.
Fig. 14 is a side elevational view of another modification of an aperture regulating mechanism which employs but a single roller chain link belt.

Although the above described form of my printer has been found from experience to give very satisfactory results, a modified form thereof as shown in Figs. 12 and 13 is particularly useful in converting existing manually operated or semi-automatic printers to the fully automatic type. In this form of the device, only one of the belts C is used, with the shields S mounted thereon actuating a mechanism 148 used in controlling the width of a light opening rather than the shields serving this purpose. The mechanism 148 is preferably mounted on a plate 149 which can be positioned on the forward portion of an existing printer whereby two slidably mounted shutters 150 and 151 will occupy an intermediate position between the aperture and diffusion plate normally provided on the printer. In the previously described printer the mechanism 148, were it to be used, would be supported in a vertical position on the forward portion of member 35 from the plate 149. An endless roller chain belt C', which is identical to one of the previously described belts C both as to structure and the manner in which it is rotatably mounted, is advanced by the mechanism 40. The same wiring diagram as shown in Fig. 24 is used with this form of the printer.

As the roller chain belt C' is moved intermittently downward by the mechanism 40, each of the shields S' supported thereon contacts a rotatably mounted roller 152 which is mounted on a pin 153. The pin 153 extends outwardly from the lower portion of a lever 154 that is pivotally mounted on an outwardly extending shaft 155 that is affixed to a portion of the printer being converted which would correspond to the outer longitudinal face of one of the members 18. Connected to the upper end portion of lever 154 is a horizontally positioned helical spring 156 which is at all times in tension, and has its opposite end affixed to a conventional bracket 157 that is situated at a convenient position on the printer. It will be noted in Fig. 12 that due to spring 156 being in tension the lever 154 tends to be rotated in a clockwise direction whereby the outer end of each of the shields S' is brought into contact with roller 152 as the shields are moved downwardly. Movably supported on the lower portion of lever 154 on a pin 158 and extending rearwardly therefrom is a link 159 that is movably connected to a pinion 160. The pinion 160 is rotatably supported on a horizontal bolt 161 which extends outwardly from the plate 149.

Formed behind the pinion 160 in the plate 148 is a rectangular recess 162 in which the two shutters 150 and 151 are slidably mounted. The inner end portions of each of the shutters 150 and 151 overlap one another, and each is provided with a rectangular open portion 163 and 164 respectively, with the result that upon the shutters being moved longitudinally in opposite directions the open portions form a rectangular window 165 the width of which can be varied by such movement to regulate the intensity of light passing therethrough. A rectangular plate 166, having a circular opening 167 formed therein which is positioned in alignment with the window 166, retains the shutters 150 and 151 in position within the confines of recess 162. Plate 166 is formed with a rectangular open portion 168 along one end thereof in order that access may be had to the pinion 160 for oiling and maintenance purposes. The plate 166 as can best be seen in Fig. 12 is held in position on the exterior face of plate 148 in a conventional manner by a number of screws that engage both plates.

Each of the shutters 150 and 151 is formed with a rectangular opening therein through which the bolt 161 passes whereby longitudinal movement of the two shutters is possible. The shutter 150 is longitudinally moved by rotation of pinion 160 by a rack 169 that engages the upper portion of the pinion, while a similar rack 170 affixed to the shutter 151 serves to move it in the opposite direction by engaging the lower portion of the pinion. In Fig. 12 it will be seen that the engagement of rack 170 with pinion 160 is made possible by the rack projecting through a longitudinally extending opening 172 formed in the shutter 150. Thus, by rotation of the pinion 160 the two shutters 150 and 151 are moved in opposite direction whereby the width of the window 165 is varied to regulate the intensity of the printing light L in accordance with the length of the shield S that is engaging the roller 152 at that particular time.

It will be apparent that this modification of my printer has considerable in common with the preferred form of the device in that the same electrical wiring diagram is used, as is one of the roller chain belts C', with the principal difference being that each of the shields S' instead of acting as shutters themselves causes the shutters 150 and 151 to accomplish the same result by varying the width of the window 165.

Another variation of the modified form of my invention is shown in Fig. 14 whereby the link 159 instead of actuating a pinion and rack mechanism to control the width of the light window 165 accomplishes the same result by rotating a cam 180 which is mounted on a horizontally positioned shaft 181. The shutters 150' and 151', which are similar to those previously described, are slidably mounted in a longitudinally extending recess formed in a plate 182. Plate 182 is formed with an opening 182a therein which is adapted to be interposed in the beam of light L between the aperture and diffusion plate normally provided in a printer. The cam 180 is rotated by movement of the link 159 which occurs from variations in the lengths of the shields S which come in contact with the roller 152, with the result that two levers 183 and 184 pivotally mounted on the cam are moved in opposite directions. A rotatably mounted lever 185 is movably connected on the upper end to the outer extremity of lever 183, and on its lower end movably engages the outer portion of the shutter 150'. Lever 184 is pivotally connected on its outer end with the upper extremity of a rotatably mounted lever 186 which on its lower end is movably connected to the outer portion of shutter 151'. Thus upon the lever 154 being rotated due to variations in the lengths of the shields S the cam 180 is rotated by movement of link 159, with the result that the window 165' formed by the inner edges of the shutters 150' and 151' is varied in width to regulate the intensity of the printing light L.

Figure 15:
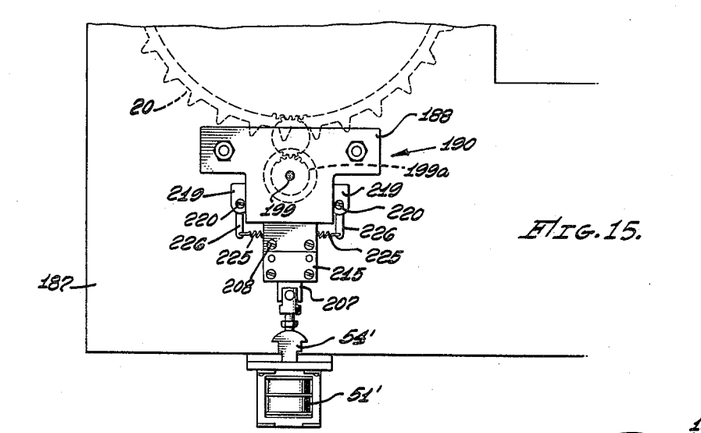
Fig. 15 is a side elevational view of a modified form of electrically controlled clutch which permits the changing of the printing light intensity for each frame of film passing through my printer.
Figures 16, 20, 21:
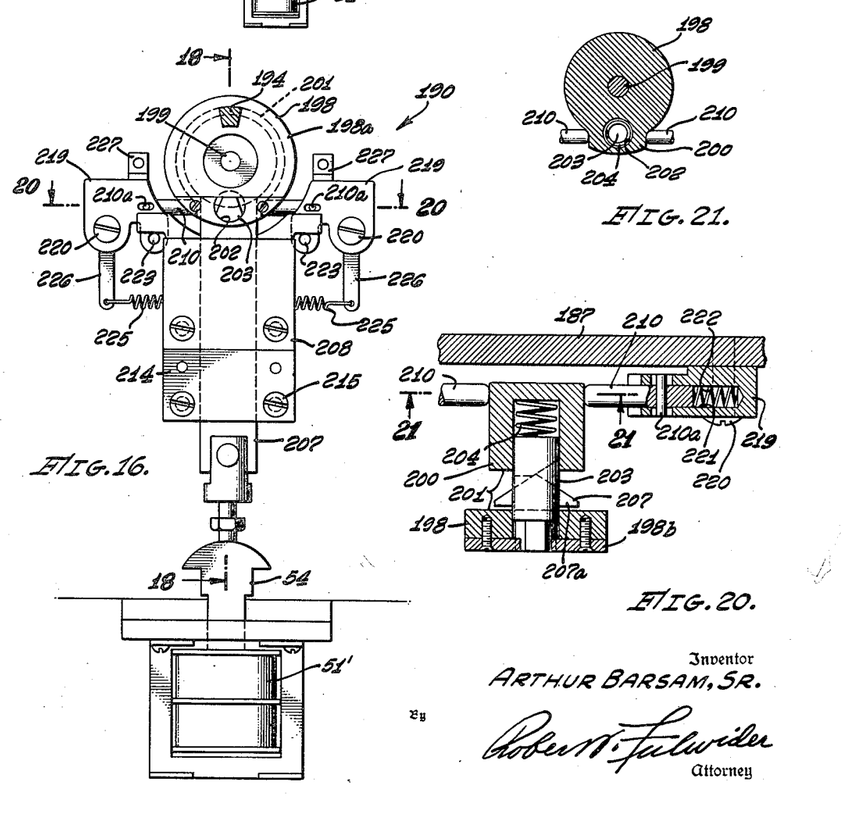
Fig. 16 is an enlarged side elevational view of the device shown in Fig. 15.
Fig. 20 is an enlarged fragmentary horizontal cross-sectional view of the device taken on the line 20—20 of Fig. 16.
Fig. 21 is a vertical cross-sectional view of the driven portion of the device taken on the line 21—21 of Fig. 20.

Shown in Figs. 15 and 16 is a mechanism 190 that is adapted to be used with both the preferred form and modified forms of my invention to replace the mechanism 40 in those situations where it is desired to be able to make a light change for each frame of film passing through the printer. The mechanism 190 is preferably situated directly under the sprockets 20 and is actuated by a horizontally positioned cylindrical driving member 191 which is continuously rotated by a conventional motor 189 at a speed considerable greater than that with which the films P and N are traveling. The member 191 is formed as a hollow cylindrical cup having sidewalls 192, and an annular plate 193 is affixed to the open end thereof. The plate 193 is formed with an outwardly extending centrally disposed boss 193a, and a bore through which a lug 194 projects. The lug 194 is maintained in position within the bore by two helical springs 195 which occupy annularly disposed positions within the confines of member 191, and are affixed to opposite sides of the lower portion of the lug. The other ends of the springs 195 are rigidly affixed to opposite sides of an inwardly extending portion 196 of the member 191. It will be apparent that as the member 191 is rotated at a constant speed the lug 194 will similarly rotate any movably mounted member with which it may come in contact, with the impact being partially absorbed by the springs 195.

To utilize the member 191 in advancing the shields S upon one of the notches 89 closing the switch 92, a cylindrical member 198 is rigidly supported on a rotatably mounted shaft 199 which is in alignment with the driving member supporting shaft 191a. The irregular shape of the cross-section of member 198 can best be seen in Fig. 21 together with the projecting portion 200 the purpose of which will hereinafter be explained. Shafts 191a and 199 are supported by rotatably engaging two laterally spaced downwardly extending members 187 and 188 respectively, which are affixed to the lower forward portion of the printer. The shaft 199 is provided with a pinion 199a as best seen in Fig. 15 that engages intermediate gearing of a conventional design that rotates shaft 19 whereupon by one rotation of the member 198 the belts C are advanced sufficiently to interpose a pair of shields S having the proper light opening 32, between the aperture A and the diffusion plate 33 to regulate the quantity of the printing light L.

Figures 17, 18, 19, 22:
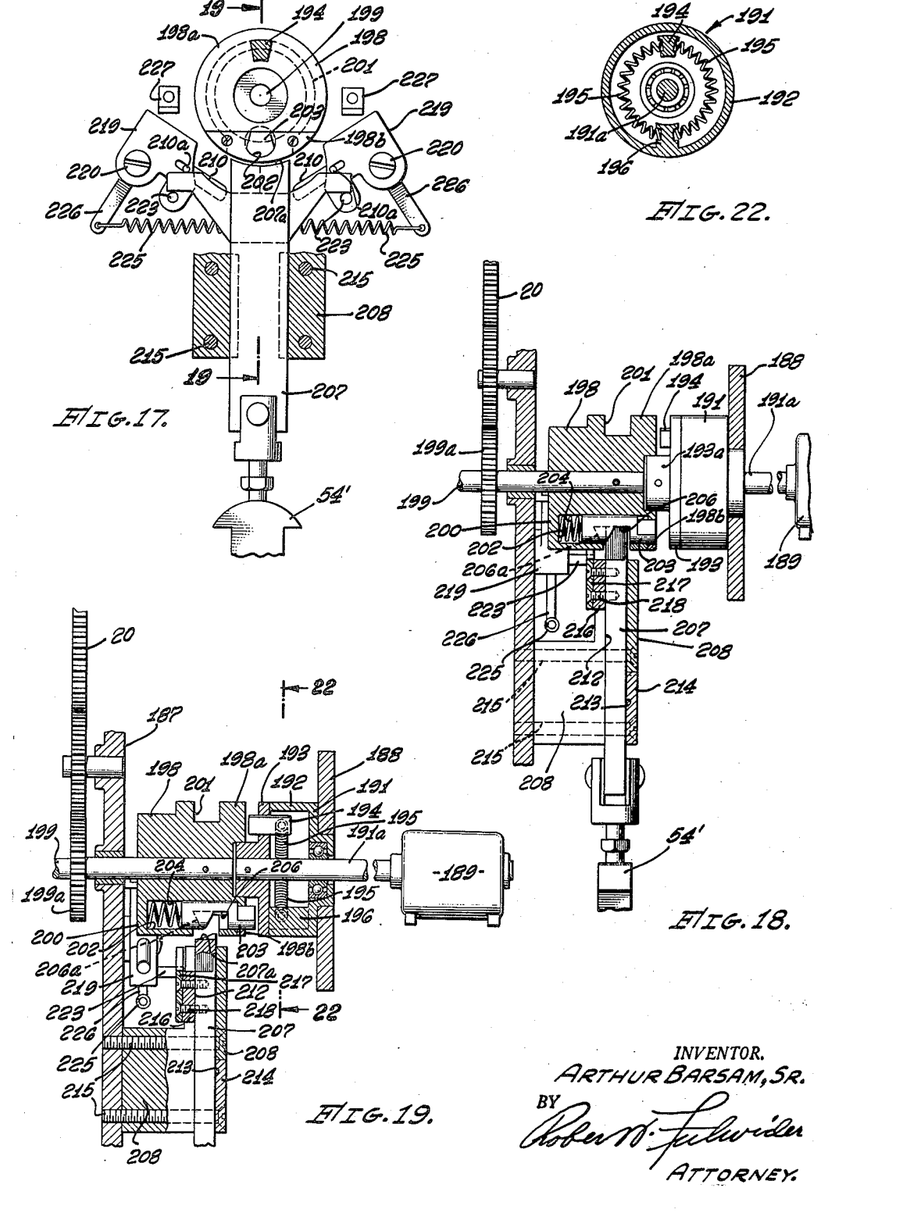
Fig. 17 is a side elevational view of the device shown in Fig. 15 with the cover plate removed therefrom.
Fig. 18 is a vertical cross-sectional view of the device taken on the line 18—18 in Fig. 16 when it is in a non-actuating position.
Fig. 19 is a vertical cross-sectional view of the device in an actuating position taken on the line 19—19 of Fig. 17.
Fig. 22 is a vertical cross-sectional view of the driving portion of the device taken on the line 22—22 on Fig. 19.

Member 198 is formed with a groove 201 of rectangular cross-section that extends therearound as can best be seen in Figs. 18 and 19, and in addition is provided with a longitudinal bore 202. The bore 202 houses a pin 203 having an irregularly shaped cross-section on the outer portion thereof, with the pin being slidably movable in the bore but unable to rotate due to the irregularly shaped portion of the pin engaging a similarly shaped slot formed in a crescent shaped plate 198b positioned in a recess formed in face 198a. A helical spring 204 which is at all times in compression is situated in the lower portion of the bore 202, with its lower end resting on the base of the bore, and its upper end tending to push the pin 203 outwardly. In order that the pin 203 will not be urged outwardly by spring 204 to engage the rotating lug 194 except when it is desired to rotate shaft 199 to advance the shields S the pin is formed with a slot 206 in the side thereof which extends inwardly to the base of groove 201. The slot 206 normally engages the extremity of a slidably mounted member 207, with the result that the pin 206 is normally held in a non-actuating position as shown in Fig. 18. The slot 206 is formed with a lower face 206a that slopes inwardly toward the base of the pin 203, as does the outer end portion 207a of the member 207 which engages the slot.

Figure 25:
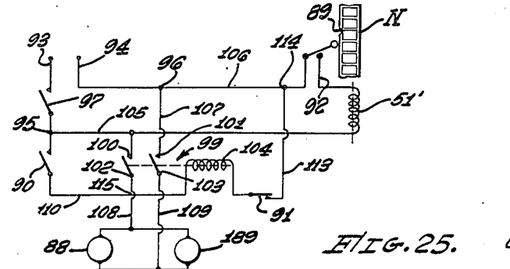
Fig. 25 is a diagrammatic view of the electric circuit used in automatically operating the last described form of printer.

The member 207 is slidably supported in a vertical position in a guide block 208, and is movably connected on its lower end to a plunger 54' that is slidable within a solenoid 51'. Both the plunger 54' and solenoid 51' are identical with the previously described plunger 54 and solenoid 51. Thus upon the solenoid 51' being electrically energized the member 207 is moved downwardly to be disengaged from the slot 206, and the pin 203 is immediately moved outwardly by the spring 204 to be engaged by the lug 194. As the solenoid 51' is energized only momentarily by a notch 89 contacting the switch 92 an electrical circuit as shown in Fig. 25 is used. Upon the solenoid 51' being de-energized the member 207 is moved upwardly into its normal position to engage the pin 203 by spring means which will hereinafter be explained. As the member 207 returns to its normal position the pin 203 is forced inwardly with its outer end flush with the exterior face of the member 198 by the sloping slot portion 206a being engaged by the similarly sloping member portion 207a as best seen in Fig. 18. Due to the rapidity of movement of the member 207 it is returned to its normal position before the member 198 has completed one revolution, with the result that it moves the pin 203 inwardly from an engaging position with the lug 194 on the completion of one revolution. Thus the belts C are advanced but one link each time the solenoid 51' is energized by a notch 89 closing switch 92. The member 198 when not rotating is held in a rigid non-movable position to prevent movement of the shields S by the portion 200 being engaged on each side by a pin 210 as can best be seen in Fig. 21.

Figure 23:
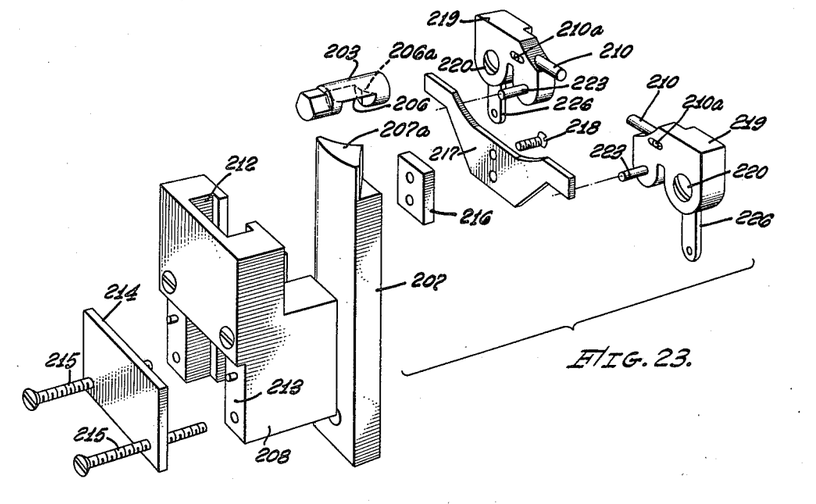
Fig. 23 is an exploded perspective view of the device shown in Figs. 15, 16, 17, 18 and 19.

In Fig. 23 it will be seen that the guide block 208 is preferably formed as a substantially rectangular block with a vertical groove 212 extending downwardly therethrough which slidably supports member 207. The lower forward portion 213 of the guide block is normally covered by a rectangular plate 214 which can be removed therefrom by the use of the screws 215 when the occasion so requires. Affixed to the upper portion of the member 207 is a spacing plate 216 that supports a horizontally extending yoke 217 by screws 218 that pass therethrough. Two laterally spaced members 219 are rotatably supported on screws 220 that engage the member 187, with each of the members having a bore 221 formed therein which proceeds upwardly from the inner face thereof, and slidably supports one of the pins 210.

In Fig. 20 it will be seen that each of the bores 221 houses a helical spring 222 which has its interior end resting on the base of the bore, and its outer end in contact with the base of one of the pins 210 to force same outwardly into contact with the member portion 200. Each of the pins 210 is provided with an outwardly extending member 210a that is slidable in a slot formed in the member 219 to prevent the pin being ejected from the bore 221 by the spring 222 when the pin is not in contact with the member portion 200. Extending forwardly from each of the members 219 is a pin 223 that engages the lower edge of the yolk 217 when the member 207 is moved downwardly by the solenoid 51'. As this movement occurs the members 219 are rotated in opposite directions to move the pins 210 downwardly from contact with the member 191 whereby it is free to rotate upon the pin 203 being engaged by the lug 194. However, upon the solenoid 51' being de-energized two helical springs 225 contract to move the member 207 upwardly to engage the slot 206, with each of the springs being positioned in tension between opposite sides of the yoke 217 and the lower end of an arm 226 that extends rigidly downward from one of the members 219. Upon member 207 returning to its normal position the pins 210 engage the member portion 200, and the shaft 199 which controls the movement of the shields S is held in a locked non-rotating position until solenoid 51' is again energized to move member 207 downwardly. It will be noted in Fig. 17 that a stop 227 is situated above each of the members 219 to prevent it from being rotated upwardly beyond a predetermined point by the spring 225.

As the member 207 in the last described form of my printer need be moved down only momentarily to be disengaged from the pin 203 the wiring diagram shown in Fig. 24 has been modified to make this possible. In Fig. 25 is shown the modified wiring diagram used in energizing the solenoid 51' upon the switch 92 being momentarily closed by a notch 89.

It will be noted that the motor control portion of the circuit shown in Fig. 25 is identical with that shown in Fig. 24 with the exception that motors 88 and 189 are connected in parallel so that both are simultaneously operated. The connections to junction points 114 and 120, terminating the conductors 106 and 105, respectively, are thus identical with the circuit shown in Fig. 24 with the exception that there is no conductor 141 connected to junction point 95. Normally open switch 92 has one of its terminals connected to junction point 114 as in the previously described circuit, but the other terminal is connected to one terminal of the solenoid 51', the remaining terminal of the latter being connected to junction point 120. In this way, momentary closure of switch 92 momentarily energizes solenoid 51', but there is no continuous energization of the latter as in the case of the relay 127 which is controlled by the switch 92 and the holding circuit relay 116 of the circuit shown in Fig. 24. In other respects, as previously mentioned, the circuit shown in Fig. 25 is similar to that shown in Fig. 24.

The above described electric clutch mechanism 190 is adapted to be used with either the preferred form of my printer, or the two modifications thereof. In operation the clutch 190 is energized by a notch 89 in the film momentarily closing the switch 92 whereupon the solenoid 51' is energized and the member 207 moved downwardly. Member 207 when in the downward position is of course disengaged from the slot 206 in the pin 203, with the result that the pin is pushed outwardly by the spring 204 is to be engaged by the rotating lug 194. During the time that the pin 203 is engaged by the lug 194 the member 198 is rotated as is the pinion 199a shown in Fig. 15. By intermediate gearing situated between the pinion 199a and fine gear teeth affixed to one of the sprockets 20, each rotation of the member 198 results in the sprockets 20 being rotated sufficiently to advance the shields S or S' into a position whereby the quantity of printing light is controlled in accordance with the light density of the negative film N from which the printing is taking place. As the solenoid 51' is only momentarily energized, the member 207 is returned to its normal slot engaging position with the member 198 by the springs 225 prior to the member 198 completing one revolution, with the result that the lever portion 207a engages the slot base 206a to move the pin 206 inwardly to a non-engaging position with the lug 194. Movement of the member 198 immediately ceases upon the pin 203 being disengaged from lug 194 due to the irregularly shaped portion 200 thereof being engaged between the spring loaded pins 210 as can best be seen in Fig. 16. Thus each notch 89 cut in the film is adapted to momentarily close the switch 92 to permit the above action to take place which results in the shields S or S' being advanced to control the quantity of printing light.

It will be apparent from the previous discussion that all of the forms of my printer are actuated by a notch 89 cut in the side of one of the films, with the result that upon the notch reaching a predetermined position a switch 92 is momentarily closed to cause shields S or S' of the proper length to regulate the quantity of the light used in the printing operation. As the shield S or S' are carried on the belts C or C' in the same sequence as the light density on the negative film N changes, there is no possibility of an error in the quantity of the light used in the printing operation.

Figures 28, 29:
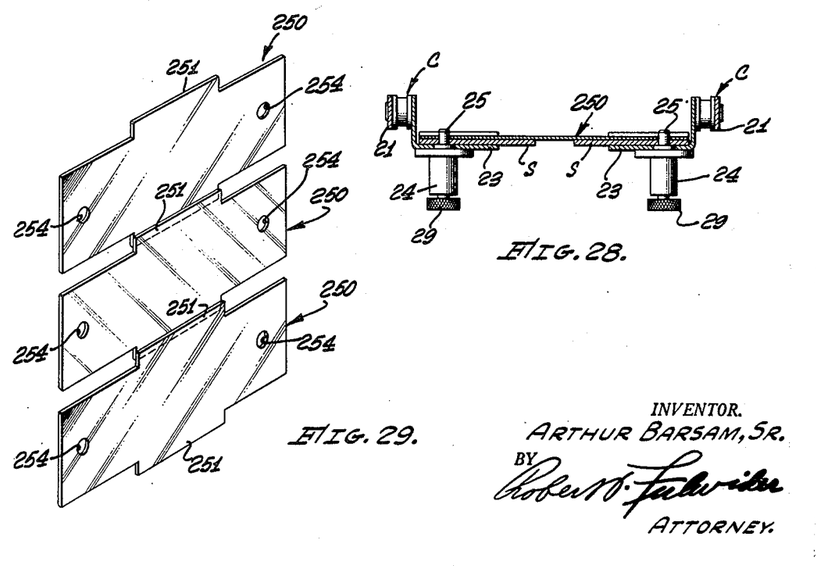
Fig. 28 is a plan view of the roller chain belts with light controlling members and filter strip supported therefrom.
Fig. 29 is a perspective view of a number of filter strips as positioned on the supporting belts.

Upon occasion it may be desired to use light filters in conjunction with the shields S on my printer. In Fig. 29 is shown a series of substantially rectangular filters 250, with each of the filters preferably being formed from a resilient thin sheet plastic material having the desired optical qualities for filtering the printing light L. It will be noted that each of the filters 250 is provided on each longitudinal side thereof with a rectangular ear 251 that extends outwardly therefrom. By the use of the ears 251 each filter overlaps the adjacent filter slightly, with the result that a continuous series of filter is provided, and each filter having light filtering qualities different from the filter adjacent to it.

Figures 26, 27:
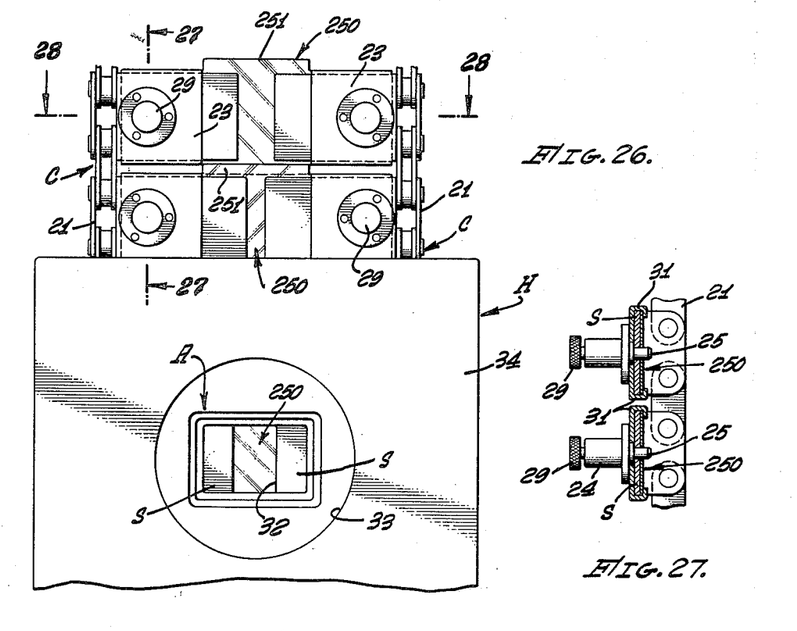
Fig. 26 is an end elevation view of the device, with both light controlling members and filter strips supported from the roller chain belts.
Fig. 27 is a vertical cross-sectional view of one of the belts taken on the line 27—27, showing light controlling members and filter strips supported therefrom.

To maintain the filters 250 in a continuous series that may be moved intermittently to position one of the filters in alignment with the printing light during the time that a particular section of the negative film N is being printed, each of the filters 250 is mounted between two horizontally aligned members 23 on the belts C as can best be seen in Fig. 26.

In Fig. 29 it will be noted that each of the filters 250 has a bore 254 formed on each end thereof. Upon the ends of each of the filters 250 being slidably inserted between the lips 31 formed on the members 23 as shown in Figs. 27 and 28, the filters are removably maintained in this position by the pins 25 engaging the bores 254. In Fig. 27 it will be seen that the lips 31 extend outwardly sufficiently to accommodate both the shields S and the filters 250.

The mechanical operation of my device with the filters 250 used in connection therewith is identical to the operation previously described in detail. Each of the filters 250 carries an identifying mark as to its particular light filtering qualities, in order that the filters can be arranged in proper sequence between the belts B in the same manner as the shields S.

While the particular apparatus and the modifications thereof herein shown and described are fully capable of attaining the objects and providing the advantages hereinbefore stated it is to be understood that it is merely illustrative of the presently preferred forms of my invention, and that I do not mean to limit myself to the details of construction or design herein shown other than as defined in the appended claims.

I claim:

1. A continuous motion picture printer which includes: a light source; a housing enclosing said source and formed with an aperture therein; means for continuously moving a plurality of films through the beam of light emitted from said aperture; signalling means provided on one of said films to indicate when a change in the intensity of said beam of light is desired; a pair of synchronously movable belts, with each of said belts being positioned on opposite sides of said aperture; a plurality of inwardly extending opaque members removably mounted on each of said belts, with said members on one of said belts cooperating with similarly positioned members on the opposite of said belts to form a continuous series of spaces of varying width therebetween; and means for advancing said belts sufficiently to interpose another pair of said members in alignment with said aperture after receiving a signal from said signaling means whereby the quantity of said light from said aperture is controlled by the width of said space existing between said newly positioned members.

2. A continuous motion picture printer which includes: a light source; a housing enclosing said source and having an aperture formed therein; means for continuously moving a plurality of films through a beam of light emitted from said aperture, with one of said films having notches formed along the side thereof at the positions where a change in the intensity of said beam of light is desired; a pair of synchronously movable belts, with each of said belts being positioned on opposite sides of said aperture; a plurality of inwardly extending opaque members mounted on each of said belts, with said members on one of said belts cooperating with similarly situated members on the opposite of said belts to form a continuous series of spaces of varying predetermined width therebetween and the width of each of said spaces controlling the quantity of said light available for printing said films; and electrical means adapted to be actuated by one of said notches to move the next of said pair of members in alignment with said aperture whereby the effective area thereof will be restricted by said newly positioned space to permit only the desired quantity of light to expose said film.

3. A continuous motion picture printer which includes: a light source; a housing enclosing said source of light and having an aperture formed therein; means for continuously moving a plurality of films through a beam of light emitted through said aperture, with one of said films having notches formed in the side thereof at the positions where a change in the intensity of said beam of light is desired; a pair of laterally spaced synchronously movable chain belts positioned on opposite sides of said aperture; a plurality of inwardly extending removably mounted opaque members supported from the links of said belts, with said members on one of said belts cooperating with similarly positioned members on the opposite of said belts to form a continuous series of vertical spaces of varying predetermined width therebetween and the width of each of said spaces controlling the quantity of light available for printing said films; electrical means for intermittently advancing said belts one link length; an electrical circuit adapted to energize said electrical means upon a switch forming a part of said circuit being contacted by one of said notches; and means for preventing said belts being moved except upon being advanced by said electrical means whereupon one of said pairs of members is placed in alignment with said aperture to permit only a predetermined quantity of light to pass through said space to expose said film.

4. A continuous motion picture printer which includes: a light source; a housing enclosing said source of light and having an aperture formed therein; means for continuously moving a plurality of films through a beam of light emitted through said aperture, with one of said films having notches formed along the side thereof at the positions a change in the light intensity is desired; a pair of laterally spaced chain belts, with said belts situated on opposite sides of said aperture; a plurality of sprockets rotatably supporting said belts; a plurality of inwardly extending removably mounted opaque members supported from the links of said belts, with said members on one of said belts cooperating with similarly situated members on the opposite of said belts to form a continuous series of spaces of varying predetermined width therebetween and the width of each of said spaces controlling the quantity of light available for printing said films; a plurality of rotatably mounted ratchets, with said ratchets being adapted to rotate one of said pair of sprockets; a pivotally mounted lever; a pawl movably connected to said lever and adapted to intermittently rotate said ratchets; electrically controlled magnetic means for moving said lever; pawl means engaging one of said ratchets and adapted to prevent any movement thereof except when said ratchets are being rotated by said lever actuated pawl; and an electrical circuit adapted to energize said magnetic means upon a normally open switch being momentarily closed by contact with one of said notches whereupon said belts are advanced one link length by said lever actuated pawl to place one of said pairs of members in alignment with said aperture to permit only a predetermined quantity of light to pass from said space to expose said films.

5. A continuous motion picture printer which includes: a light source; a housing enclosing said source of light and having an aperture formed therein; means for continuously moving a plurality of films through a beam of light emitted through said aperture, with one of said films having notches formed along the side thereof at the positions a change in the light intensity is desired; a pair of laterally spaced chain belts, with said belts being disposed on opposite sides of said aperture; a plurality of sprockets rotatably supporting said belts; a plurality of inwardly extending removably mounted opaque members supported from the links of said belts, with said members on one of said belts cooperating with similarly situated members on the other of said belts to form a continuous series of spaces of varying predetermined width therebetween and the width of each of said spaces controlling the quantity of light available for printing said films; a plurality of rotatably mounted ratchets, with said ratchets being adapted to rotate said belts; a pivotally mounted lever; a pawl adapted to intermittently rotate said ratchets movably connected to said lever; a pair of laterally spaced electro-magnets, with each of said magnets having a plunger movably connected to said lever; pawl means engaging said ratchets and adapted to prevent any movement of said belts except when said ratchets are being rotated by said lever actuated pawl; an electrical circuit adapted to energize one of said electro-magnets whereby said lever is actuated to advance said ratchets sufficiently to interpose another pair of members between said aperture and said films to control the quantity of the light exposing said films by restricting the effective area of said aperture; a normally open electrical switch included in said electrical circuit which is adapted to be closed by contacting one of said notches to complete the circuit to one of said magnets; relay means for keeping said circuit closed until the newly positioned pair of said members has been fully interposed between said aperture and said films; and electrical means for breaking said electrical circuit to said belt advancing electro-magnet while completing an electrical circuit to the other of said magnets whereby said lever is rotated in the opposite direction to be returned to its normal position until such time as said electrical circuit is again completed to said belt advancing electro-magnet by said switch being closed by contact with one of said notches.

6. A motion picture printer which includes: a light source; a housing enclosing said light source and having an aperture formed therein; means for continuously moving a plurality of films having notches formed along the side thereof at the positions a change in the light intensity is desired; an endless chain belt; a plurality of sprockets rotatably supporting said belt; a plurality of outwardly extending rigid members of various lengths supported from the links of said belt; a plurality of rotatably mounted ratchets, with said ratchets being adapted to rotate said belt; a pivotally mounted lever;

a pawl adapted to intermittently rotate said ratchets with said pawl being movably connected to said lever; a pair of laterally spaced electromagnets, with each of said magnets having a plunger movably connected to said lever; pawl means engaging said ratchets and adapted to prevent any movement of said belt except when said ratchets are being rotated by said lever actuated pawl; an electrical circuit adapted to energize one of said electromagnets whereby said lever is actuated to advance said ratchets sufficiently to move one of said members to a predetermined position; a pivotally mounted member adapted to be rotated in proportion to the length of said member which is advanced to said predetermined position; a rotatably mounted pinion; a pair of slidably movable shutters interposed between said aperture and said films, with each of said shutters having an opening formed in the end portion thereof, and said openings being adapted to form a rectangular window which may be varied in width by the opposite movement of said shutters; a pair of racks, with each of said racks being affixed to one of said shutters and engaging said pinion whereby upon said pinion being rotated by the movement of said belt supported member said window is varied in width to control the quantity of the light available for printing purposes by restricting the effective area of said aperture; a normally open electrical switch included in said electrical circuit which is adapted to be closed by contacting one of said notches to complete the circuit to one of said magnets; relay means for keeping said circuit closed until the movement of said shutters has been completed; and electrical means for breaking the electrical circuit to said shutter moving electromagnet while completing an electrical circuit to the other of said magnets whereby said lever is rotated in the opposite direction to be returned to its normal position until such time as said electrical circuit is again completed to energize said shutter actuating magnet.

7. A motion picture printer which includes: a light source; a housing enclosing said light source and having an aperture formed therein; means for continuously moving a plurality of films through a beam of light emitted through said aperture, with one of said films having notches formed along the side thereof at the positions a change in the light intensity is desired; an endless chain belt; a plurality of sprockets rotatably supporting said belt; a plurality of rigid members of various lengths supported from the links of said belt; a plurality of rotatably mounted ratchets, with said ratchets being adapted to rotate said belt; a pivotally mounted lever; a pawl adapted to intermittently rotate said ratchets, with said pawl being movably connected to said lever; a pair of laterally spaced electromagnets, with each of said magnets having a plunger movably connected to said lever; pawl means engaging said ratchets and adapted to prevent any movement of said belt except when said ratchets are being rotated by said lever actuated pawl; an electrical circuit adapted to energize one of said electromagnets whereby said lever is actuated to advance said ratchets sufficiently to move one of said members to a predetermined position; a pivotally mounted member adapted to be rotated in proportion to the length of said member which is advanced to said predetermined position; a rotatably mounted cam; a pair of slidably movable shutters interposed between said aperture and said films, with each of said shutters having an opening formed therein, and said openings cooperating to form a rectangular window which may be varied in width by the opposite movement of said shutters to regulate the effective area of said aperture; a pair of rotatably mounted arms, with each of said arms being movably connected to said cam and to the end portion of one of said shutters whereby upon the rotation of said cam said shutters are moved in opposite direction to control the quantity of the light exposing said films; a normally open electrical switch included in said electrical circuit which is adapted to be closed by contacting one of said notches to complete the circuit to one of said magnets; relay means for keeping said circuit closed until the movement of said shutters has been completed; and electrical means for breaking the electrical circuit to said shutter moving electromagnet while completing an electrical circuit to the other of said magnets whereby said lever is rotated in the opposite direction to be returned to its normal position until such time as said electrical circuit is again completed to energize said shutter actuating magnet.

8. A continuous motion picture printer which includes: a light source; a housing enclosing said light source and having an aperture formed therein; means for continuously moving a plurality of films through a beam of light emitted through said aperture, with one of said films having notches formed along the side thereof at the positions where a change in the intensity of said beam of light is desired; a pair of laterally spaced chain belts, with said belts being disposed on opposite sides of said aperture and situated between said aperture and said films; means for rotatably supporting said belts; a plurality of inwardly extending removably mounted opaque members supported from the links of said belts, with said members on one of said belts cooperating with oppositely situated members on the other of said belts to form a continuous series of spaces therebetween of varying width with the area of each of said spaces controlling the quantity of light available for printing said films; a continuously rotating driving member, with said member being provided with engaging means; a driven member connected to said belt supporting means, with said driven member being adapted to advance said belts one link upon being rotated a certain amount; means for causing said driven member to be engaged by said driving member; means for causing said driven member to be disengaged from said driven member after said driving member has been rotated said amount; and an electrical circuit adapted to cause said driving member and said driven member to be engaged upon a normally open switch in said circuit being closed by contact with one of said notches whereby said belts are advanced to interpose the next pair of said opaque members between said aperture and said films to regulate said beam of light by causing it to pass through one of said spaces.

9. A continuous motion picture printer which includes: a light source; a housing enclosing said light source and having an aperture formed therein; means for continuously moving a plurality of films through a beam of light emitted through said aperture, with one of said films having notches formed along one side thereof at the positions where a change in the intensity of said beam of light is desired; a pair of laterally spaced chain belts, with said belts being disposed on opposite sides of said aperture and situated between said aperture and said films; a plurality of sprockets for rotatably supporting said belts; a plurality of inwardly extending removably mounted members supported from the links of said belts, with said members on one of said belts cooperating with oppositely situated members on the other of said belts to form a continuous series of spaces therebetween of varying width with the width of each of said spaces controlling the quantity of light available for printing said films; a continuously rotating driving member, with said member being provided with an outwardly extending lug; a driven member movably connected to said belt supporting sprockets; a slidably mounted pin supported on said driven member, with said pin being adapted to be engaged by said lug when said pin is in an outwardly extended position whereby said driven member is rotated; means for disengaging said pin from said lug after said driven member has been rotated sufficiently to advance said belts one link length; an electrical circuit adapted to cause said pin to be placed in an engaging position after one of said notches has contacted a normally open switch in said circuit to momentarily place it in a closed position; and means for disengaging said pin from said lug after said driven member has been rotated sufficiently to advance belts one link length whereby the next pair of opaque members is interposed between said aperture and films to regulate the quantity of said light by causing it to pass through one of said spaces.

10. A continuous motion picture printer which includes: a light source; a housing enclosing said light source, and having an aperture formed therein; means for continuously moving a plurality of films through a beam of light emitted through said aperture, with one of said films having notches formed along one side thereof at the positions where a change in the intensity of said beam of light is desired; a pair of laterally spaced chain belts, with said belts being disposed on opposite sides of said aperture, and situated between said aperture and said films; a plurality of sprockets for rotatably supporting said belts; a plurality of inwardly extending removably mounted opaque members supported from the links of said belts, with said members on one of said belts co-operating with the members on the other of said belts to form a continuous series of spaces therebetween of varying width with the area of each of said spaces controlling the quantity of light available for printing said films; a continuously rotating driving member, with said member being provided with an outwardly extending lug; a cylindrical driven member movably connected to said sprockets, with said member being formed with a groove extending around the sidewalls thereof and a bore which is in communication with said groove; a spring loaded pin slidably mounted in said bore, with said pin being formed with a slot having an inwardly extending base; a slidably mounted member having a sloping end portion which normally engages said slot formed in said pin to prevent said pin from engaging said lug; an electro magnet having a plunger movably connected to said slidably mounted member whereby upon said magnet being energized said member is disengaged from said slot to permit said pin to engage said lug and rotate said driven member; spring means for returning said slidably mounted member to an engaging position with said slot in said pin whereby said pin is disengaged from said lug after said driven member has advanced said members; spring means for holding said driven member in a stationary position except when said pin is in an engaging position; an electrical circuit adapted to momentarily energize said electro-magnet upon a normally open switch in said circuit being closed by contact with one of said notches whereby the next pair of said opaque members is advanced to be interposed between said aperture and said films to regulate the quantity of said light by causing it to pass through one of said spaces.

11. A shield supporting member for a continuous printer which includes: a chain link; an L-shaped support rigidly affixed to one side of said link; and means for holding a rectangular opaque member in place on said L-shaped member with two of said members when laterally spaced from one another forming a space between the inner ends thereof that may be used in controlling the quantity of light emitted from said printer.

12. A shield supporting member for a continuous printer which includes: a chain link; an L-shaped member supported from one side of said link; and a spring loaded pin movably supported on said member, with said pin being adapted to pass through a bore formed in said member to engage and firmly hold in position a slidably mounted opaque member which is adapted to be mounted on the outwardly extending portion of said L-shaped member and two of said members when laterally positioned to form a space between the inner ends thereof that may be used to control the quantity of printing light emitted from said printer.

13. An endless belt for controlling the light of a continuous printer which includes: a plurality of links movably connected together; a plurality of L-shaped members, with each of said members being rigidly affixed to one of said links; and means for removably holding opaque rectangular members in position on each of said L-shaped members with two of said members when laterally positioned forming a space therebetween that may be used to control the quantity of light emitted from said printer.

14. An endless belt for controlling the light of a continuous printer which includes: a plurality of links movably connected together; a plurality of L-shaped members, with each of said members being rigidly supported from one of said links; and a plurality of spring loaded pins, with each of said pins being movably mounted on one of said L-shaped members to engage and removably hold in position a rectangular opaque member that is slidably mounted thereon with two of said members when laterally positioned forming a space therebetween that may be used to control the quantity of light emitted from said printer.

15. An endless belt for controlling the light of a continuous printer which includes: a plurality of links movably connected together; a plurality of L-shaped members, with each of said members being rigidly affixed to one of said links, and each of said L-shaped members being formed with a bore therein; a plurality of hollow cylindrical members, with each of said members being rigidly affixed to one of said L-shaped members and in alignment with said bore formed therein; a plurality of pins, with each of said pins being slidably movable within one of said bores and said cylinders; a plurality of helical springs, with each of said springs being situated within the confines of one of said cylinders; a plurality of collars, with each of said collars situated on one of said pins inside one of said cylindrical members and in contact with the lower end of one of said springs which at all times tends to move said pin outwardly through said bore but is restrained from so doing by said collar contacting said L-shaped member; and a plurality of handles, with each of said handles being formed on the portion of one of said pins extending from the outer end of one of said cylinders whereby upon said handle being pulled outwardly the opposite end of said pin is moved to a non-engaging position and an opaque member can be slidably mounted on said L-shaped member or withdrawn therefrom with said members when mounted on two of said belts that are laterally positioned to form spaces therebetween that may be used to control the quantity of light emitted from said printer.

16. A light intensity controlling mechanism for a printer which includes: a rotatably mounted shaft, with the rotation of said shaft actuating means whereby the intensity of said light from said printer is controlled; a pair of ratchets rigidly affixed to said shaft, with one of said ratchets having teeth adapted to impart only clockwise rotation thereto, and the opposite ratchet having teeth adapted to only impart counter-clockwise rotation thereto; an arm rotatably mounted on said shaft; an inwardly extending pin provided on the outer end of said arm; a pawl rotatably mounted on said pin, with said pawl being adapted to impart intermittent counter-clockwise rotation to said ratchet capable of receiving same upon the downward movement of said arm; a pivotally mounted lever, with one end of said lever being movably connected to said arm; a pair of vertically spaced electro magnets, with each of said magnets being provided with a plunger, and each of said plungers being movably connected to the opposite end of said lever; an electrical circuit adapted to energize first one of said electro magnets and then the opposite of said magnets whereby said pawl is moved downwardly to rotate said shaft through a distance equivalent to one tooth length of said ratchets; pawl means engaging one of said ratchets to prevent clockwise rotation of said shaft; pawl means engaging one of said ratchets to prevent counterclockwise rotation of said shaft except when said shaft is being rotated in a counter-clockwise direction by said arm supported pawl; and pawl means normally engaging said inwardly extending pin but upon said ratchets being rotated in a counter-clockwise direction moving downwardly to engage the teeth of one of said ratchets whereby the ratchets cannot be rotated more than one tooth length in a counter-clockwise direction by one stroke of said pivotally mounted lever.

17. A light intensity controlling mechanism for a printer which includes: a rotatably mounted shaft, with the rotation of said shaft actuating means whereby the intensity of said light is controlled; an inwardly and outwardly positioned ratchet rigidly mounted on said shaft, with said inwardly positioned ratchet having teeth adapted to impart only clockwise rotation thereto, and said outwardly positioned ratchet having teeth adapted to impart only counter-clockwise rotation thereto; an arm rotatably mounted on said shaft; an inwardly extending pin provided on the upper portion of said arm; a spring loaded pawl rotatably mounted on said pin, with said pawl at all times urged inwardly into contact with said outer ratchet by said spring, and on said pawl being moved downwardly intermittent counter-clockwise rotation is imparted to said outwardly positioned ratchet; a pivotally mounted lever, with one end thereof being movably connected to said arm; a pair of vertically spaced electro magnets, with each of said magnets being provided with a slidably mounted plunger therein, and each of said plungers being movably connected to the opposite end of said lever; an electric circuit adapted to energize first the upper and then the lower of said electro magnets whereby said pawl is moved downwardly to rotate said shaft the equivalent of one tooth length of said ratchets in a counter-clockwise direction; a rotatably mounted pawl engaging said outer ratchet to prevent clockwise rotation of said shaft; a rotatably mounted detent which engages said inner ratchet to prevent said shaft from being rotated more than one tooth length upon said arm moving downwardly in a ratchet advancing movement; a rotatably mounted pawl engaging said inner ratchet to prevent counter-clockwise movement of said shaft except when it is being rotated by said arm supported pawl, with said pawl being provided with an outwardly extending spring loaded pin; and a rigid member affixed to the forward portion of said lever that engages the upper portion of said spring loaded pin to rotate said pawl supporting it to a non-engaging position whereby said shaft can be rotated in a counter-clockwise direction, with said pin being moved inwardly as said lever supported member moves upwardly to its normal position after said shaft has been rotated.

18. A continuous motion picture printer which includes: a light source; a housing enclosing said source and formed with an aperture therein; two laterally spaced synchronously movable belts situated on opposite sides of said aperture; and a plurality of opaque members affixed to said belts and extending inwardly toward one another in pairs to form longitudinal spaces of varying width therebetween, with each of said spaces controlling the quantity of light available from said aperture for printing purposes when said space is positioned in front of said aperture; and means for moving said belts longitudinally whereby the change from one of said spaces to another is effected without interrupting the light emitted through said aperture.

19. A continuous motion picture printer which includes: a light source; a housing enclosing said source and formed with an aperture therein; two laterally spaced synchronously movable belts situated on opposite sides of said aperture; and a plurality of opaque members affixed to said belts and extending inwardly toward one another to form a continuously extending space that is made up of segments of varying width, with each of said segments when positioned in front of said aperture controlling the quantity of light from said aperture available for printing purposes; and means for moving said belts to effect a change from one of said segments to another without interrupting the light emitted through said aperture.

20. A continuous motion picture printer which includes: a light source and means defining a light path therefrom; means for continuously moving a plurality of films through said light path; a pair of synchronously movable belts positioned on opposite sides of said light path; a plurality of inwardly extending light shields removably mounted on each of said belts, the shields on one of said belts cooperating with oppositely positioned shields on the other of said belts to form a continuous series of apertures of varying width therebetween; and means for advancing said belts to successively interpose consecutive pairs of shields in said light path whereby the quantity of said light available for printing is controlled by the width of the aperture formed between the shields positioned in said light path.

21. A continuous motion picture printer which includes: a light source and means defining a light path therefrom; means for continuously moving a plurality of films through said light path; a pair of synchronously movable belts positioned on opposite sides of said light path; a plurality of inwardly extending light shields removably mounted on each of said belts, the shields on one of said belts cooperating with oppositely positioned shields on the other of said belts to form a continuous series of apertures of varying width therebetween; and means for automatically advancing said belts to successively interpose consecutive pairs of shields in said light path whereby the quantity of said light available for printing is controlled by the width of the aperture formed between the shields positioned in said light path in response to a predetermined signal initiated by the movement of said films.

22. A continuous motion picture printer which includes: a light source and means defining a light path therefrom; means for continuously moving a plurality of films through said light path; a pair of synchronously movable belts positioned on opposite sides of said light path; a plurality of light shields on each of said belts cooperating with shields on the other of said belts to form a continuous series of printing apertures of predetermined width therebetween; and means for automatically advancing said belts to successively interpose consecutive pairs of shields in said light path whereby the quantity of said light available for printing is controlled by the width of the aperture formed between the shields positioned in said light path in response to a predetermined signal initiated by the movement of said films.

23. A continuous motion picture printer which includes: a light source and means defining a light path therefrom; means for continuously moving a plurality of films through said light path; belt means adjacent said light path and extending thereacross and movable longitudinally of said films to provide a continuous longitudinally extending space of varying width to thereby vary the effective printing light available from said light source; and means for advancing said belt means to provide successive printing apertures of variable width in said light path.

24. A continuous motion picture printer which includes: a light source and means defining a light path therefrom; means for continuously moving a plurality of films through said light path; belt means adjacent said light path and movable longitudinally of said films to provide a continuous longitudinally extending space of varying width to thereby vary the effective printing light available from said light source; means for advancing said belt means to provide successive printing apertures of variable width in said light path; and control means responsive to movement of said films for initiating movement of said belt means as required by the printing light requirements of said films.

25. Shield supporting means for a continuous printer which includes: a chain link; a support member affixed to one side of said link; and means for holding a shield member in place on said support member, two of said shield members laterally spaced from one another being adapted to form a space between the inner ends thereof that may be used in controlling the quantity of printing light in said printer.

26. Shield supporting means for a continuous printer which includes: a chain link; a support member affixed to said link; means for holding a rectangular member in place on said support member, two of said rectangular members laterally spaced from one another being adapted to form a space between the inner ends thereof that may be used in controlling the quantity of printing light in said printer; and a spring loaded pin movably supported on said supporting member adapted to pass through a bore in said member to engage and firmly hold said rectangular member.

27. In a continuous motion picture printer, endless belt means comprising: a plurality of links movably connected together; a plurality of supporting members affixed to said links; and means for removably holding shield members in position on said supporting members, two of said shield members when laterally positioned, forming a space therebetween that may be used to control the quantity printing of light available from said printer.

28. A motion picture printer which includes: a light source and means having an aperture defining a light path therefrom; means for moving a plurality of films through said light path; belt means having a plurality of outwardly extending rigid members of various lengths supported thereon; means for supporting said belt means and for intermittently advancing same; a pivotally mounted member adjacent said belt means and urged to engage said rigid members thereon, the position of said pivotal member depending upon the length of the rigid member with which it is engaged; a rotatably mounted member connected to said pivotal member and adapted to be rotated thereby; a pair of slidable shutters interposed in said light path adjacent said aperture and adapted to vary the size of same; means reversely connecting said shutters to said rotatable member whereby upon rotation of said rotatable member in response to movement of said belt means and the engagement of a different rigid member with said pivotal member, said shutters are moved in opposite directions to vary the effective width of said aperture and thereby vary the quantity of light available for printing.

29. A motion picture printer which includes: a light source and means having an aperture defining a light path therefrom; means for moving a plurality of films through said light path; belt means having a plurality of outwardly extending rigid members of various lengths supported thereon; means for supporting said belt means and for intermittently advancing same; a movable member mounted adjacent said belt means and engageable with the rigid members carried thereby, the operative position of said movable member depending upon the length of the rigid member with which it is engaged; a pair of slidable shutters cooperatively mounted in said light path adjacent said aperture; and means operatively connecting said shutters to said movable member to move said shutters in opposite directions in response to movement of said movable member caused by advancement of said belt means.

References Cited in the file of this patent

UNITED STATES PATENTS

| Number | Name | Date |
|---|---|---|
| 1,069,881 | Kellom | Aug. 12, 1913 |
| 1,205,582 | Tessier | Nov. 21, 1916 |
| 1,225,335 | Howell | May 18, 1917 |
| 1,296,870 | Sohm | Mar. 11, 1919 |
| 1,572,798 | Hubbard | Feb. 9, 1926 |
| 1,590,361 | Garbutt | June 29, 1926 |
| 1,620,168 | Silver | Mar. 8, 1927 |
| 1,626,841 | Kelley et al. | May 3, 1927 |
| 1,725,944 | Thompson | Aug. 27, 1929 |
| 1,743,310 | Beidler | Jan. 14, 1930 |
| 1,803,404 | Owens | May 5, 1931 |
| 1,813,000 | Thompson | July 7, 1931 |
| 1,899,756 | Janssen | Feb. 28, 1933 |
| 1,933,693 | Adatte | Nov. 7, 1933 |
| 2,001,596 | Owens | May 14, 1935 |
| 2,047,474 | Howell | July 14, 1936 |
| 2,117,727 | Jones | May 17, 1938 |
| 2,122,689 | Jones | July 5, 1938 |
| 2,205,179 | Schultz | June 18, 1940 |
| 2,324,080 | Haunty | July 18, 1943 |
| 2,325,102 | Boschen | July 27, 1943 |
| 2,337,736 | Cawein | Dec. 28, 1943 |
| 2,356,885 | Reeves | Aug. 29, 1944 |
| 2,515,420 | Oakhill | July 18, 1950 |
| 2,518,571 | Reeves | Aug 15, 1950 |